(12) United States Patent
Kim (10) Patent No.: US 10,772,710 B2
(45) Date of Patent: Sep. 15, 2020

(54) TOOTH IMPLANT SYSTEM

(71) Applicant: Kwang Seob Kim, La Mirada, CA (US)

(72) Inventor: Kwang Seob Kim, La Mirada, CA (US)

( * ) Notice: Subject to any disclaimer, the term of this patent is extended or adjusted under 35 U.S.C. 154(b) by 0 days.

(21) Appl. No.: 15/803,276

(22) Filed: Nov. 3, 2017

(65) Prior Publication Data

US 2019/0133720 A1    May 9, 2019

(51) Int. Cl.
*A61C 8/00*    (2006.01)

(52) U.S. Cl.
CPC .......... *A61C 8/0051* (2013.01); *A61C 8/006* (2013.01); *A61C 8/0039* (2013.01); *A61C 8/0057* (2013.01); *A61C 8/0063* (2013.01); *A61C 8/0065* (2013.01); *A61C 8/0054* (2013.01); *A61C 8/0068* (2013.01); *A61C 8/0074* (2013.01)

(58) Field of Classification Search
CPC ..... A61C 8/0051; A61C 8/0039; A61C 8/006; A61C 8/0054; A61C 8/0068; A61C 8/0048; A61C 8/0056; A61C 8/0066; A61C 8/0069
See application file for complete search history.

(56) References Cited

U.S. PATENT DOCUMENTS

| | | | | |
|---|---|---|---|---|
| 5,125,840 A * | 6/1992 | Durr | .................. | A61C 8/005 433/173 |
| 6,416,324 B1 * | 7/2002 | Day | .................. | A61C 8/008 433/173 |
| 6,461,160 B1 * | 10/2002 | Sutter | .................. | A61C 8/0012 433/172 |
| 7,137,816 B2 * | 11/2006 | Gervais | .................. | A61C 8/0001 433/173 |
| 7,300,283 B2 * | 11/2007 | Aravena | .................. | A61C 8/005 433/173 |
| 2008/0182227 A1 * | 7/2008 | Wolf | .................. | A61C 8/005 433/174 |
| 2012/0270180 A1 * | 10/2012 | Dahlstrom | .................. | A61C 8/005 433/173 |
| 2013/0244204 A1 * | 9/2013 | Magnusson | .................. | A61C 8/0066 433/173 |
| 2013/0295521 A1 * | 11/2013 | Olsson | .................. | A61C 8/0066 433/173 |

(Continued)

*Primary Examiner* — Cris L. Rodriguez
*Assistant Examiner* — Drew S Folgmann
(74) *Attorney, Agent, or Firm* — John K. Park; Park Law Firm (57) ABSTRACT

A tooth implant system is provided, comprising a fixture, protrusions, and an abutment. The fixture has a top opening portion, a bottom closed portion, an inner surface portion, an outer surface portion, and a central hole portion surrounded by the inner surface portion. The plurality of protrusions are provided on the inner surface portion of the fixture at locations of substantially same heights from the bottom closed portion and with even circumferential intervals, and each of the plurality of protrusions comprises a vertical stop and a bottom edge. The abutment comprises an upper cylindrical portion, a middle connecting portion extending from the top cylindrical portion, and a lower engaging portion extending from the middle connecting portion. The lower engaging portion of the abutment is configured to be received into the central hole portion surrounded by the protrusions and engage with the protrusions.

9 Claims, 7 Drawing Sheets

(56) References Cited

U.S. PATENT DOCUMENTS

| | | | |
|---|---|---|---|
| 2015/0230888 A1* | 8/2015 | Porter | A61C 8/0001 433/201.1 |
| 2016/0143703 A1* | 5/2016 | Monty | A61C 1/0015 433/29 |
| 2016/0193017 A1* | 7/2016 | Kim | A61C 8/0078 433/201.1 |
| 2016/0206407 A1* | 7/2016 | Kim | A61C 8/0037 |
| 2016/0206409 A1* | 7/2016 | Kim | A61C 8/0078 |

* cited by examiner

— Prior Art —

TOOTH IMPLANT SYSTEM

BACKGROUND OF THE INVENTION

The present invention relates to a tooth implant system.

In the conventional tooth implant systems, the fixture and the abutment are fixed to each other through an inclined surface in the fixture, a hex structure preventing rotation, a screw structure for fixing the abutment that are provided in separate locations. Therefore, the mechanical stress from the abutment have to be dispersed at the top portion of the fixture. Such mechanical stress at the top portion of the fixture caused many problems to the alveolar bone and the abutment screw.

That is, the abutment could be collapsed downwards, and the abutment screw could get loosened. In certain serious situations, the fixture could be damaged.

Accordingly, a need for a tooth implant system has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a tooth implant system, which is reliable in engaging the fixture with the abutment.

An aspect of the invention provides a tooth implant system comprising a fixture, a plurality of protrusions, and an abutment.

The fixture has a top opening portion, a bottom closed portion, an inner surface portion, an outer surface portion, and a central hole portion surrounded by the inner surface portion.

The plurality of protrusions are provided on the inner surface portion of the fixture at locations of substantially same heights from the bottom closed portion and with even circumferential intervals, and each of the plurality of protrusions comprises a vertical stop and a bottom edge.

The abutment comprises an upper cylindrical portion, a middle connecting portion extending from the top cylindrical portion, and a lower engaging portion extending from the middle connecting portion.

The lower engaging portion of the abutment is configured to be received into the central hole portion surrounded by the plurality of protrusions and engage with the plurality of protrusions.

The fixture may further comprise an engaging surface portion provided on the outer surface portion of the fixture, and the engaging surface portion may comprise threads configured to be engaged with and fixed to an alveolar bone of a user.

The inner surface portion of the fixture may comprise a top tilted portion, a bottom tilted portion, and a connecting tilted portion.

The top tilted portion is provided between an edge of the top opening portion of the fixture and the vertical stops of the plurality of protrusions, and tilted by a first angle with respect to a horizontal line.

The bottom tilted portion is provided between the bottom edges of the plurality of protrusions and an edge of the bottom closed portion of the fixture, and tilted by a second angle with respect to a horizontal line.

The connecting tilted portion connects vertically the top tilted portion and the bottom tilted portion and is disposed between two neighboring protrusions.

The first angle and the second angle may be same or different, and the first angle, the second angle, or the first and second angles may be determined according to corresponding surface tilting angles of the abutment.

A portion of the abutment corresponding to and engaging the top tilted portion of the inner surface portion may be tilted by an angle smaller than the first angle. A portion of the abutment corresponding to and engaging the bottom tilted portion of the inner surface portion may be tilted by an angle same as the second angle, and an elastic coating may be provided on the portion of the abutment corresponding to and engaging the bottom tilted portion of the inner surface portion.

The elastic coating may further cover the middle connecting portion of the abutment, which is configured to prevent external substance from depositing.

The elastic coating may be configured to be colored to match a color of teeth of the user.

Each of the plurality of protrusions may comprise a contacting surface of an isosceles trapezoid shape and two side tilted edge surfaces, and each of the two side tilted edge surfaces may be tilted by an angle same as or larger than the first or second angle.

The abutment may comprise having a plurality of branches, each of which being adapted to be inserted into a gap between two neighboring protrusions.

Each of the plurality of branches may comprise two prongs configured to be pushed inwards by the two side tilted edge surfaces of two neighboring protrusions so as to make a strongly-pressed engagement. Each of the plurality of branches may further comprise a base surface provided on a bottom portion of the branch at roots of the two prongs, and the base surface of the abutment may contact closely with the vertical stop provided on a top portion of the protrusion of the fixture.

The abutment may have a plurality of branches, each of which comprising two lateral tilted surfaces configured to contact closely with the two side tilted edge surfaces of two neighboring protrusions so as to make a strongly-pressed engagement.

Each of the plurality of branches may further comprise a base surface provided on a bottom portion of the branch at roots of the two prongs, and a gap may be provided between the base surface of the abutment contacts closely and the vertical stop provided on a top portion of the protrusion of the fixture, so that the two lateral tilted surfaces of the abutment make a strong contact with the two side tilted edge surfaces of two neighboring protrusions.

Each of the plurality of protrusions may comprise threads, which are configured to engage corresponding threads provided on an outer surface of the lower engaging portion of the abutment.

The tooth implant system may further comprise an abutment screw, which is received in and engages with an inner through-hole provided through the abutment, so as to facilitate engaging between the abutment and the fixture.

The tooth implant system may further comprise a ring spring disposed a ring groove around a neck portion between the middle connecting portion and the lower engaging portion of the abutment.

The tooth implant system may further comprise an elastic band disposed around a neck portion between the middle connecting portion and the lower engaging portion of the abutment, and the elastic band may be configured to engage with the contacting surface of the corresponding protrusion.

The tooth implant system may further comprise a plurality of bumps and a plurality of male locking threads.

The plurality of bumps may be provided on the inner surface portion of the fixture below the corresponding protrusions, and the corresponding protrusion and bump forms a female locking thread inbetween.

The plurality of male locking threads may be provided on the lower engaging portion of the abutment and configured to engage the corresponding female locking threads.

The plurality of male locking threads may be configured to be inserted between two neighboring protrusions and rotated by a predetermined angle so as to engage with the corresponding female locking threads.

The bottom edge of the protrusion of the fixture may be tilted by the same angle as the corresponding bump provided below the protrusion.

Each of the plurality of male locking threads may be configured to rotated by about one quarter (¼) turn or less.

The number the of plurality of protrusions may be three (3), four (4), or five (5).

The advantages of the present invention are: (1) The tooth implant system according to the invention is simple in structure but provides reliable solutions for tooth implant; and (2) The tooth implant system of the invention provides a strong engagement among parts thereof.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Referring to the figures, the embodiments of the invention are described in detail.

Figure 1:
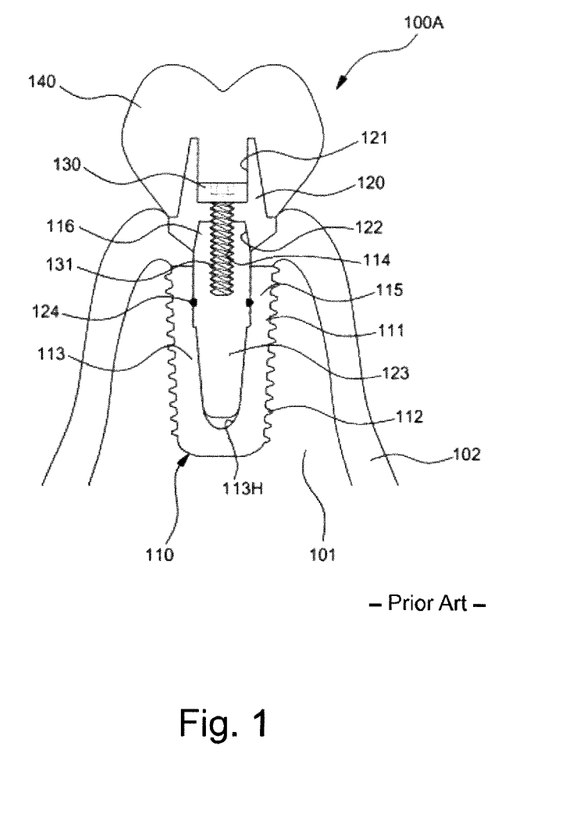
FIG. 1 is a cross-sectional view showing an implant unit according to a prior art.

FIG. 1 shows a cross-sectional view of an implant unit (100A) according to a prior art, which includes parts and environments such as alveolar bone (101), gum (102), fixture (110), outer body (111), threads (112), inner body (113), long hole (113H), stress-releasing gap (114), stress-releasing gap (115), top portion (116), abutment (120), groove (121), groove (122), middle structure (123), engaging ring (124), screw (130), and artificial tooth (140).

An aspect of the invention provides a tooth implant system (1000) comprising a fixture (200), a plurality of protrusions (260), and an abutment (300).

Figure 3:
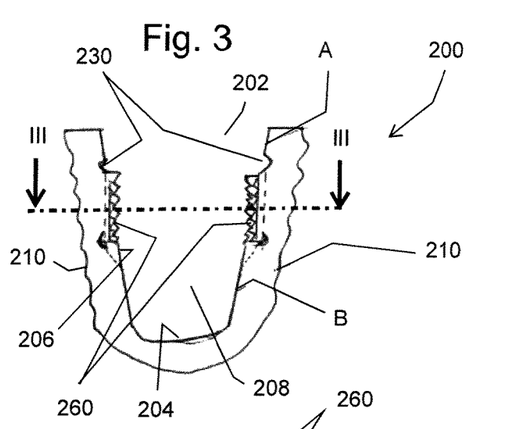
FIG. 3 is a cross-sectional view showing a fixture of the tooth implant system of FIG. 2 according to an embodiment of the invention.

The fixture (200) has a top opening portion (202), a bottom closed portion (204), an inner surface portion (206), an outer surface portion (210), and a central hole portion (208) surrounded by the inner surface portion (206) as shown in FIG. 3.

Figures 11, 12:
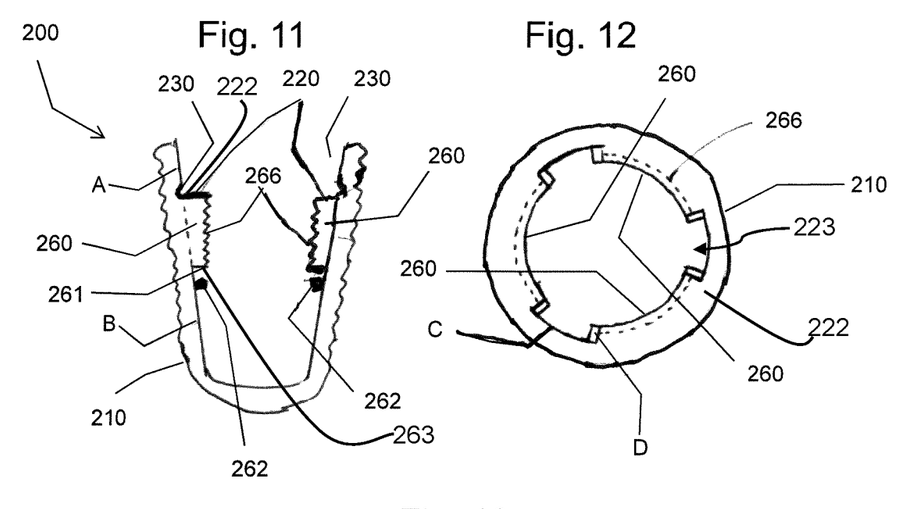
FIG. 11 is a cross-section view showing a fixture with a ring spring groove according to still another embodiment of the invention.
FIG. 12 is a cross-sectional view of the fixture of FIG. 11 cutting horizontally across protrusion portion according to still another embodiment of the invention.

The plurality of protrusions (260) are provided on the inner surface portion (206) of the fixture (200) at locations of substantially same heights from the bottom closed portion (204) and with even circumferential intervals, and each of the plurality of protrusions (260) comprises a vertical stop (220) formed by a upper surface (222) of the plurality of protrusions (260) and a bottom edge (261) formed by a lower surface (263) of the plurality of protrusions (260) as shown in FIG. 11. Also, as shown in FIG. 11, the diameter of the top opening portion is greater than the diameter of the outer edge of upper surfaces of the plurality of protrusions, the diameter of the outer edge of the upper surfaces of the plurality of protrusions is greater than the diameter of the outer edge of the lower surfaces of the plurality of protrusions, and the diameter of the outer edge of the lower surfaces of the plurality of protrusions—is greater than the diameter of the bottom closed portion of the fixture.

Figure 5:
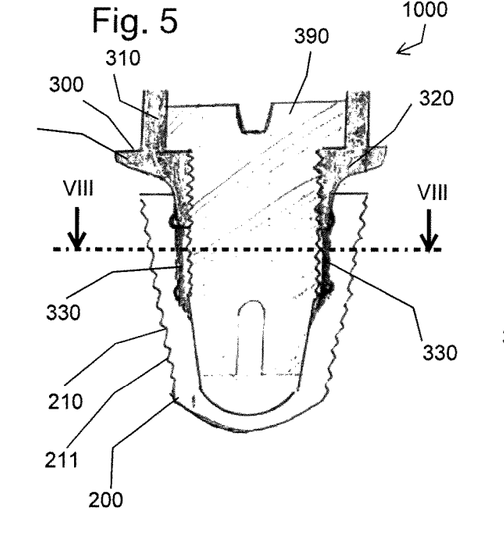
FIG. 5 is a cross-sectional view showing a tooth implant system according to another embodiment of the invention.

The abutment (300) comprises an upper cylindrical portion (310), a middle connecting portion (320) extending from the top cylindrical portion (310), and a lower engaging portion (330) extending from the middle connecting portion (320) as shown in FIG. 5.

The lower engaging portion (330) of the abutment (300) is configured to be received into the central hole portion (208) surrounded by the plurality of protrusions (260) and engage with the plurality of protrusions (260) as shown in FIGS. 2, 5, 9, 10, 11, and 18.

The fixture (200) may further comprise an engaging surface portion (211) provided on the outer surface portion (210) of the fixture (200), and the engaging surface portion (211) may comprise threads configured to be engaged with and fixed to an alveolar bone of a user as shown in FIG. 5.

Figure 4:
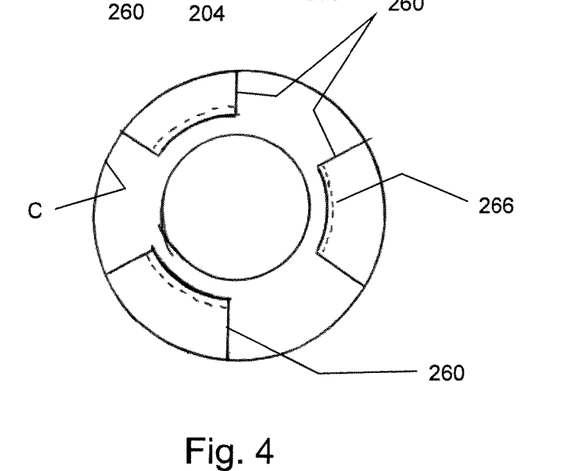
FIG. 4 is a cross-sectional view showing the fixture of the tooth implant system of FIG. 3 along line according to an embodiment of the invention.

The inner surface portion (206) of the fixture (200) may comprise a top tilted portion (A), a bottom tilted portion (B), and a connecting tilted portion (C) as shown FIGS. 3, 4, and 11.

The top tilted portion (A) is provided between an edge of the top opening portion (202) of the fixture (200) and the vertical stops (220) of the plurality of protrusions (260), and tilted by a first angle with respect to a horizontal line.

The bottom tilted portion (B) is provided between the bottom edges (261) of the plurality of protrusions (260) and an edge of the bottom closed portion (204) of the fixture (200), and tilted by a second angle with respect to a horizontal line.

The connecting tilted portion (C) connects vertically the top tilted portion (A) and the bottom tilted portion (B) and is disposed between two neighboring protrusions (260) as shown in FIGS. 3 and 4.

Figure 2:
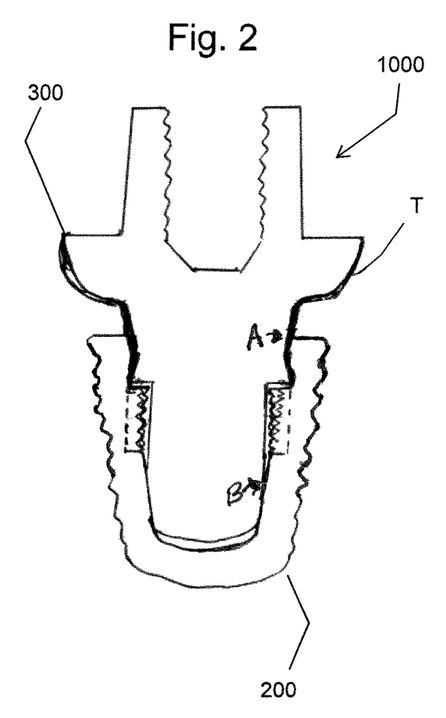
FIG. 2 is a cross-sectional view showing a tooth implant system according to an embodiment of the invention.

The first angle and the second angle may be same or different, and the first angle, the second angle, or the first and second angles may be determined according to corresponding surface tilting angles of the abutment (300) as shown in FIG. 2.

A portion of the abutment (300) corresponding to and engaging the top tilted portion (A) of the inner surface portion (206) may be tilted by an angle smaller than the first angle. A portion of the abutment (300) corresponding to and engaging the bottom tilted portion (B) of the inner surface portion (206) may be tilted by an angle same as the second angle, and an elastic coating (T) may be provided on the the portion of the abutment (300) corresponding to and engaging the bottom tilted portion (B) of the inner surface portion (206). The elastic coating (T) is represented as the darker portion in FIG. 2, and it may be provided over the top tilted portion (A) only. In certain embodiments of the invention, the elastic coating (T) may be a Teflon coating, and in such case, it may extend up to the portion making a contact with the gum, so as to prevent germs or other external material from being attached thereto.

The elastic coating (T) may further cover the middle connecting portion (320) of the abutment (300), which is configured to prevent external substance from depositing as shown in FIG. 2.

The elastic coating (T) may be configured to be colored to match a color of teeth of the user.

Figure 13:
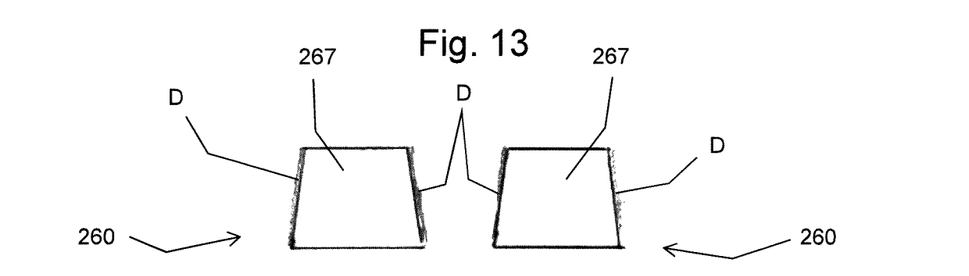
FIG. 13 is a front view showing two neighboring protrusions of a fixture according to an embodiment of the invention.
Figure 14:
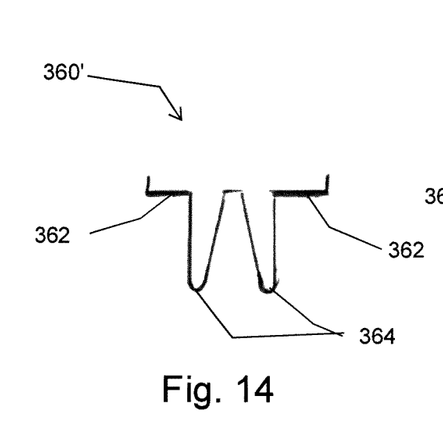
FIG. 14 is a partial front view of a branch with two prongs of an lower engaging portion of an abutment according to still another embodiment of the invention.
Figure 15:
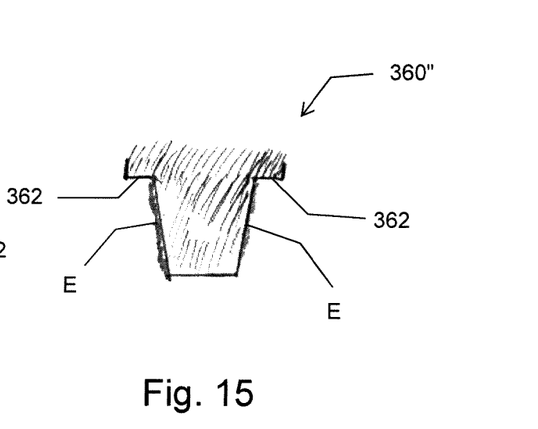
FIG. 15 is a partial front view of a branch of an lower engaging portion of an abutment according to still another embodiment of the invention.

Each of the plurality of protrusions (260) may comprise a contacting surface (267) of an isosceles trapezoid shape and two side tilted edge surfaces (D), and each of the two side tilted edge surfaces (D) may be tilted by an angle same as or larger than the first or second angle as shown in FIG. 13.

Figures 6, 7:
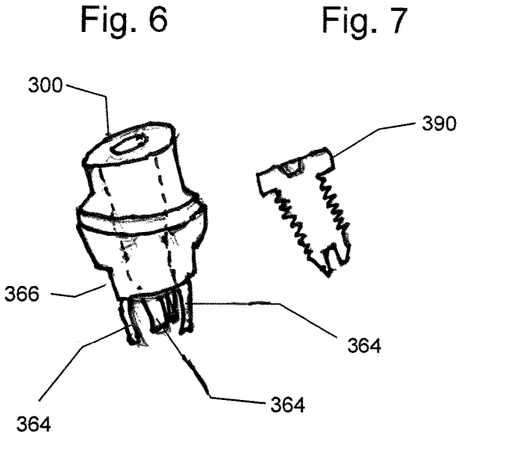
FIG. 6 is a perspective view showing an abutment of the tooth implant system of FIG. 5 according to an embodiment.
FIG. 7 is a cross-sectional view of an abutment screw of the tooth implant system of FIG. 5 according to an embodiment.

The abutment (300) may comprise having a plurality of branches (364), each of which being adapted to be inserted into a gap between two neighboring protrusions (260) as shown in FIGS. 5 and 6.

Each of the plurality of branches (364) may comprise two prongs configured to be pushed inwards by the two side tilted edge surfaces (D) of two neighboring protrusions (260) so as to make a strongly-pressed engagement as shown in FIGS. 11-14. Each of the plurality of branches (364) may further comprise a base surface (362) provided on a bottom portion of the branch (364) at roots of the two prongs, and the base surface (362) of the abutment (300) may contact closely with the vertical stop (220) provided on a top portion of the protrusion (260) of the fixture (200) as shown in FIGS. 2, 11, 14, 15.

Alternatively, the abutment (300) may have a plurality of branches (364), each of which comprising two lateral tilted surfaces (E) configured to contact closely with the two side tilted edge surfaces (D) of two neighboring protrusions (260) so as to make a strongly-pressed engagement as shown in FIGS. 11-13, and 15.

Each of the plurality of branches (364) may further comprise a base surface (362) provided on a bottom portion of the branch (364) at roots of the two lateral tilted surfaces (E), and a gap may be provided between the base surface (362) of the abutment (300) contacts closely and the vertical stop (220) provided on a top portion of the protrusion (260) of the fixture (200), so that the two lateral tilted surfaces (E) of the abutment (300) make a strong contact with the two side tilted edge surfaces (D) of two neighboring protrusions (260).

Each of the plurality of protrusions (260) may comprise threads (266) on the contacting surface (267), which are configured to engage corresponding threads provided on an outer surface of the lower engaging portion (330) of the abutment (300) as shown in FIGS. 5 and 6. In certain embodiments of the invention, the threads (266) of the protrusion (260) may engage with the threads of the abutment screw (390) in FIG. 7, not engaging the abutment (300) directly.

The tooth implant system (1000) may further comprise an abutment screw (390), which is received in and engages with an inner through-hole provided through the abutment (300), so as to facilitate engaging between the abutment (300) and the fixture (200) as shown in FIGS. 5-8.

The tooth implant system (1000) may further comprise a ring spring (400) disposed a ring groove (230) around a neck portion (340) between the middle connecting portion (320) and the lower engaging portion (330) of the abutment (300) as shown in FIGS. 3, 11, 17, and 18.

The upper cylindrical portion (310), the middle connecting portion (320), and the lower engaging portion (330) may be formed integrally to form the abutment (300). The upper cylindrical portion (310) may be covered by the crown portion, the middle connecting portion (320) may meet the prongs (364) at its lower end and be coated with elastic coating over the portion contacting with the inner surface of the implant and the gum portion, and the lower engaging portion (330) may comprise the branches (364).

Figure 10:
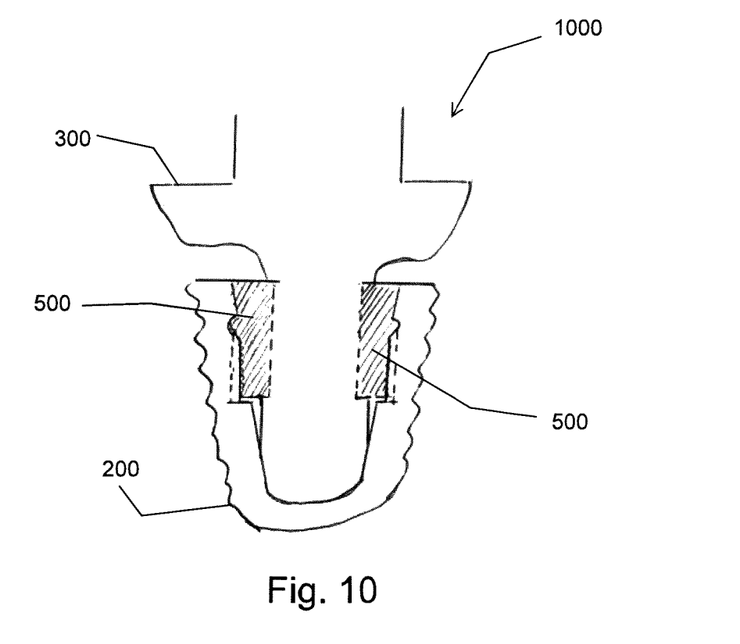
FIG. 10 is a cross-sectional view of a tooth implant system with an elastic band according to still another embodiment of the invention.

The tooth implant system (1000) may further comprise an elastic band (500) disposed around a neck portion between the middle connecting portion (320) and the lower engaging portion (330) of the abutment (300), and the elastic band (500) may be configured to engage with the contacting surface (267) of the corresponding protrusion (260) as shown in FIG. 10.

The tooth implant system (1000) may further comprise a plurality of bumps (262) and a plurality of male locking threads (366) as shown in FIG. 11.

Figure 16:
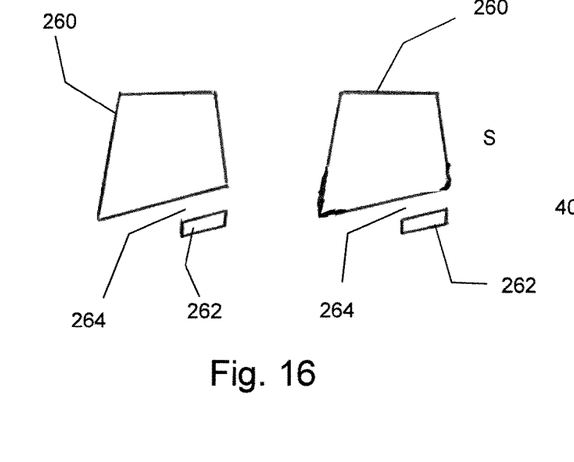
FIG. 16 is a front view showing two neighboring protrusions along with a locking female thread according to an embodiment of the invention.

The plurality of bumps (262) may be provided on the inner surface portion (206) of the fixture (200) below the corresponding protrusions (260), and the corresponding protrusion (260) and bump (262) forms a female locking thread (264) inbetween as shown in FIGS. 11 and 16.

Figure 18:
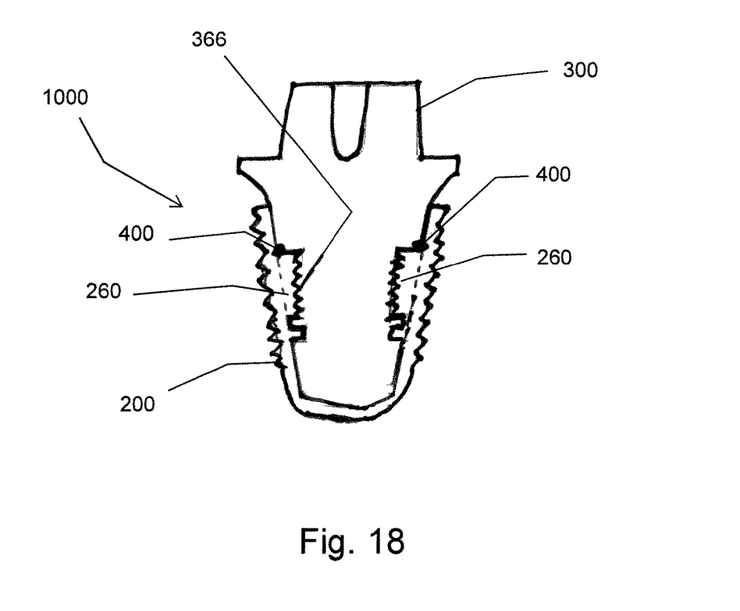
FIG. 18 is a cross-sectional view showing a tooth implant system having protrusions in FIG. 16 and the abutment in FIG. 17 according to an embodiment of the invention.

The plurality of male locking threads (366) may be provided on the lower engaging portion (330) of the abutment (300) and configured to engage the corresponding female locking threads (266) as shown in FIGS. 5 and 18.

Alternatively, the portion (366) may be provided without any threads, comprise vertical and parallel cross-section, providing a small gap with respect to the corresponding protrusions (260) as shown in FIG. 18.

The plurality of male locking threads (366) may be configured to be inserted between two neighboring protrusions (260) and rotated by a predetermined angle so as to engage with the corresponding female locking threads (266) as shown in FIGS. 5-8.

The bottom edge (261) of the protrusion (260) of the fixture (200) may be tilted by the same angle as the corresponding bump (262) provided below the protrusion (260).

Each of the plurality of male locking threads (366) may be configured to rotated by about one quarter (¼) turn or less.

Figure 8:
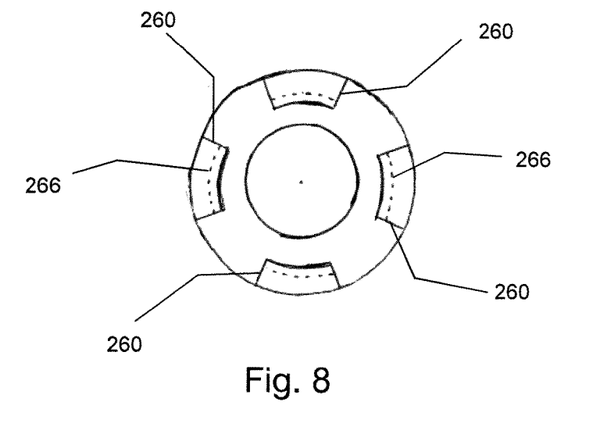
FIG. 8 is a cross-sectional view of a fixture of the tooth implant system of FIG. 7 without the abutment according to an embodiment of the invention.

The number the of plurality of protrusions may be three (3), four (4), or five (5) as shown in FIGS. 4, 8, and 12. As shown on these Figs., the plurality of protrusions (260) are radially spaced apart forming a horizontally radial gap (223) between two adjacent protrusions.

In the embodiment illustrated in FIG. 2, the abutment (300) does not comprise threads engaging the threads (266) formed on the protrusions (260) of the implant or fixture (200), so as to bypass the threads (266) of the fixture (200), and the engaging force is obtained through the frictional force against the tilted portions and the ring spring (400).

In FIG. 5, the portion (366) is just vertical surfaces without any threads.

In FIG. 6, the abutment (300) does not include the portion (366). That is, the portion (366) is provided in abutments (300) that do not include abutment screw (390) but extend to the lower portion of the protrusions (260). That is, the portion (366) is not provided in the branches (364).

The lower end portion of the middle connecting portion (320) contacts with the top tilted surface (A) above the protrusion (260) and the lower engaging portion (330) are the branches (364) in FIG. 6 and the branches are inserted and contacts closely in the gap between two neighboring protrusions (260), providing engaging force and preventing rotation of the abutment (300). Each of the branches (364) in FIG. 16 may include two prongs as in FIG. 14. In contrast, in FIG. 15, each of the branches (364) is not forked, which is same as in FIG. 6. FIG. 11 shows the same fixture (200) as in FIG. 18.

Figure 9:
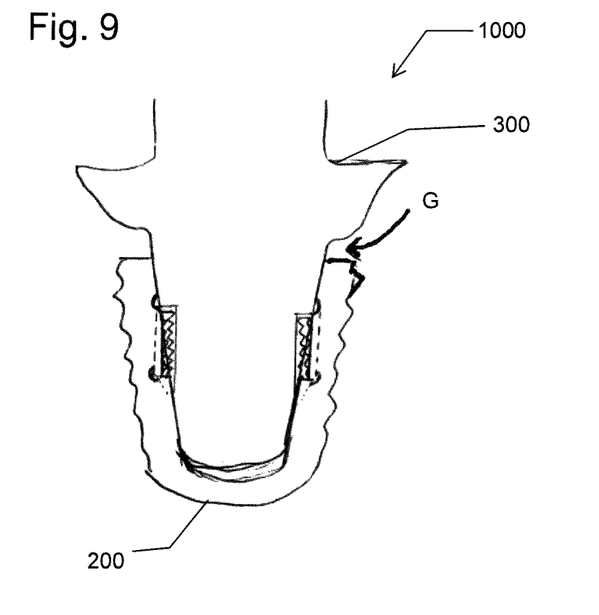
FIG. 9 is a cross-sectional view of a tooth implant system according to still another embodiment of the invention.

In FIG. 9, the portion (G) may be filled with a gum portion, preventing food piece or debris from entering into the fixture (200), and it may work as a fulcrum to an abutment-removing tool (not shown).

Figure 19:
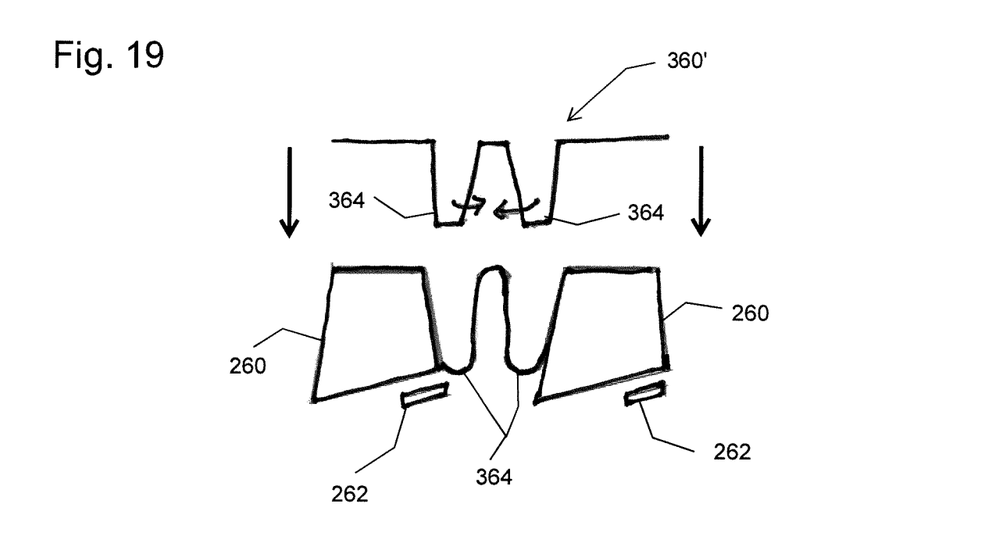
FIG. 19 is a cross-sectional view showing two prongs of an lower engaging portion of an abutment being inserted to two neighboring protrusions according to still another embodiment of the invention.

FIG. 19 shows two prongs (364) of an lower engaging portion (330) of an abutment being inserted to two neighboring protrusions (260).

Figure 17:
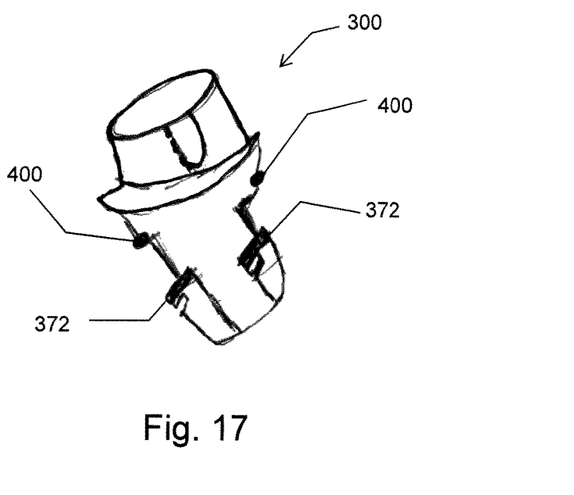
FIG. 17 is a perspective view of an abutment to engage with a fixture having protrusions with the locking female thread in FIG. 16 according to an embodiment of the invention.
Figure 20:
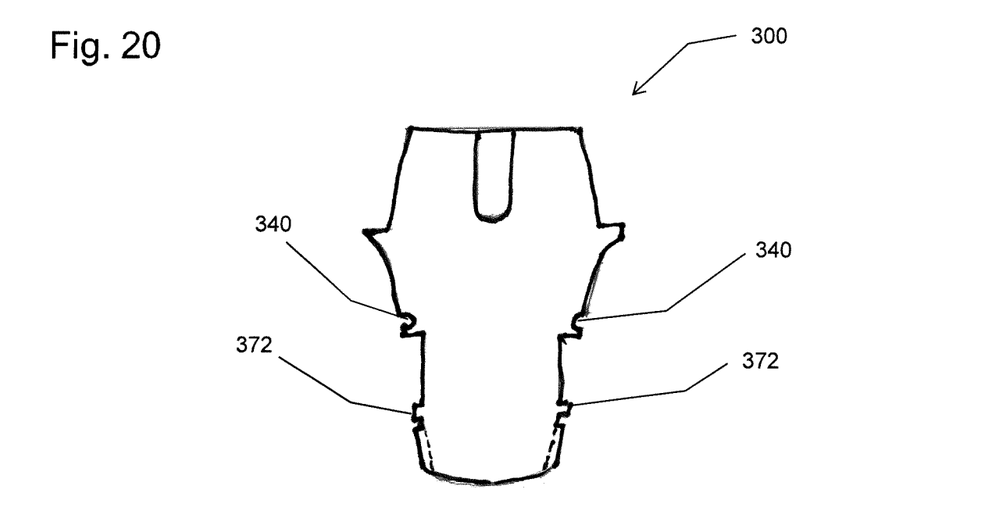
FIG. 20 is a cross-sectional view showing the abutment in FIG. 17 according to an embodiment of the invention.

FIG. 20 shows a cross-sectional view of the abutment (300) in FIG. 17.

In FIGS. 5-8 and 19, the abutment is inserted vertically into the fixture and engages with the fixture through the engagement between the two prongs (364) and the two neighboring protrusions (260), without subsequent rotation.

In contrast, in FIGS. 16-18 and 20, the abutment is inserted vertically into the fixture and then rotates a little so that the portion (372) is slid into the portion (264) to be locked.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A tooth implant system comprising:
a fixture having a top opening portion, a bottom closed portion, an inner surface portion, an outer surface portion, and a central hole portion surrounded by the inner surface portion; and
an abutment comprising an upper cylindrical portion, a middle connecting portion extending from the upper cylindrical portion, and a lower engaging portion extending from the middle connecting portion;
wherein the inner surface portion comprises a top tilted portion provided between an edge of the top opening portion of the fixture and a plurality of upper surfaces of a plurality of protrusions,
a bottom tilted portion provided between a bottom edge of the plurality of protrusions and an edge of the bottom closed portion of the fixture, and a connecting tilted portion located between the top tilted portion and the bottom tilted portion such that the circumference of top tilted portion is greater than the circumference of the bottom tilted portion, wherein the connecting tilted portion is comprised of the plurality of protrusions that are radially spaced apart, forming a radial gap between two adjacent protrusions, wherein each of the plurality of protrusions has a contacting surface with a plurality of threads, and wherein the plurality of threads on each protrusion are physically separated apart from the plurality of threads from the adjacent protrusion due to the radial gap between adjacent protrusions;
wherein the lower engaging portion of the abutment is configured to be received into the central hole portion surrounded by the plurality of protrusions and engage with the plurality of protrusions;
wherein the abutment further comprises of one or more branches, each branch is adapted to be inserted into the radial gap between adjacent protrusions.

2. The tooth implant system of claim 1, wherein the fixture further comprises an engaging surface portion provided on the outer surface portion of the fixture, and wherein the engaging surface portion comprises threads configured to be engaged with and fixed to an alveolar bone of a user.

3. The tooth implant system of claim 2, further comprising an abutment screw, which is received in and engages with an inner through-hole provided through the abutment, so as to facilitate engaging between the abutment and the fixture.

4. A tooth implant system comprising:
a fixture having a top opening portion, a bottom closed portion, an inner surface portion, an outer surface portion, and a central hole portion surrounded by the inner surface portion; and
an abutment comprising an upper cylindrical portion, a middle connecting portion extending from the upper cylindrical portion, and a lower engaging portion extending from the middle connecting portion;

wherein the inner surface portion comprises a top tilted portion provided between an edge of the top opening portion of the fixture and a plurality of upper surfaces of a plurality of protrusions, a bottom tilted portion provided between a bottom edge of the plurality of protrusions and an edge of the bottom closed portion of the fixture, and a connecting tilted portion located between the top tilted portion and the bottom tilted portion such that the circumference of top tilted portion is greater than the circumference of the bottom tilted portion, wherein the connecting tilted portion is comprised of the plurality of protrusions that are radially spaced apart, forming a radial gap between two adjacent protrusions, wherein each of the plurality of protrusions has a contacting surface with a plurality of threads, wherein the plurality of threads on each protrusion are physically separated apart from the plurality of threads from the adjacent protrusion due to the radial gap between adjacent protrusions, and wherein the connecting tilted portion is sloped so that the diameter of the top opening portion is greater than the diameter of an outer edge of the upper surfaces of the plurality of protrusions;

wherein the lower engaging portion of the abutment is configured to be received into the central hole portion surrounded by the plurality of protrusions and engage with the plurality of protrusions;

wherein the abutment further comprises of one or more branches, each branch is adapted to be inserted into the radial gap between adjacent protrusions.

5. The tooth implant system of claim 4, wherein the fixture further comprises an engaging surface portion provided on the outer surface portion of the fixture, and wherein the engaging surface portion comprises threads configured to be engaged with and fixed to an alveolar bone of a user.

6. The tooth implant system of claim 5, further comprising an abutment screw, which is received in and engages with an inner through-hole provided through the abutment, so as to facilitate engaging between the abutment and the fixture.

7. A tooth implant system comprising:

a fixture having a top opening portion, a bottom closed portion, an inner surface portion, an outer surface portion, and a central hole portion surrounded by the inner surface portion; and an abutment comprising an upper cylindrical portion, a middle connecting portion extending from the upper cylindrical portion, and a lower engaging portion extending from the middle connecting portion;

wherein the inner surface portion comprises a top tilted portion provided between an edge of the top opening portion of the fixture and a plurality of upper surfaces of a plurality of protrusions, a bottom tilted portion provided between a bottom edge of the plurality of protrusions and an edge of the bottom closed portion of the fixture, and a connecting tilted portion located between the top tilted portion and the bottom tilted portion such that the circumference of top tilted portion is greater than the circumference of the bottom tilted portion, wherein the connecting tilted portion is comprised of the plurality of protrusions that are radially spaced apart, forming a radial gap between two adjacent protrusions, wherein each of the plurality of protrusions has a contacting surface with a plurality of threads, wherein the plurality of threads on each protrusion are physically separated apart from the plurality of threads from the adjacent protrusion due to the radial gap between adjacent protrusions, and wherein the connecting tilted portion is sloped so that the diameter of the top opening portion is greater than the diameter of an outer edge of the upper surfaces of the plurality of protrusions;

wherein the bottom tilted portion is sloped so that the diameter of a bottom edge of the plurality of protrusions is greater than the diameter of the bottom closed portion;

wherein the lower engaging portion of the abutment is configured to be received into the central hole portion surrounded by the plurality of protrusions and engage with the plurality of protrusions; and wherein the abutment further comprises of one or more branches, each branch is adapted to be inserted into the radial gap between adjacent protrusions.

8. The tooth implant system of claim 7, wherein the fixture further comprises an engaging surface portion provided on the outer surface portion of the fixture, and wherein the engaging surface portion comprises threads configured to be engaged with and fixed to an alveolar bone of a user.

9. The tooth implant system of claim 8, further comprising an abutment screw, which is received in and engages with an inner through-hole provided through the abutment, so as to facilitate engaging between the abutment and the fixture.

* * * * *